United States Patent
Talupuru et al.

(10) Patent No.: US 10,990,121 B2
(45) Date of Patent: *Apr. 27, 2021

(54) APPARATUS AND METHOD FOR ACHIEVING GLITCH-FREE CLOCK DOMAIN CROSSING SIGNALS

(71) Applicant: ARM Finance Overseas Limited, Cambridge (GB)

(72) Inventors: Kesava Reddy Talupuru, Fremont, CA (US); Sanjai B. Athi, Santa Clara, CA (US)

(73) Assignee: ARM Finance Overseas Limited, Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/795,668

(22) Filed: Feb. 20, 2020

(65) Prior Publication Data

US 2020/0192421 A1 Jun. 18, 2020

Related U.S. Application Data

(63) Continuation of application No. 15/783,559, filed on Oct. 13, 2017, now Pat. No. 10,606,307, which is a continuation of application No. 13/683,912, filed on Nov. 21, 2012, now Pat. No. 9,817,433.

(60) Provisional application No. 61/562,975, filed on Nov. 22, 2011.

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC ..................................... G06F 1/08; G06F 1/12
See application file for complete search history.

(56) References Cited

U.S. PATENT DOCUMENTS

| | | | |
|---|---|---|---|
| 4,569,017 A * | 2/1986 | Renner | G06F 11/1679 713/375 |
| 9,817,433 B2 | 11/2017 | Talupuru et al. | |
| 10,606,307 B2 | 3/2020 | Talupuru et al. | |
| 2005/0268265 A1* | 12/2005 | Ly | G06F 30/33 716/108 |
| 2010/0050061 A1 | 2/2010 | Suzuki et al. | |
| 2011/0116337 A1 | 5/2011 | Hay et al. | |
| 2013/0132760 A1 | 5/2013 | Talupuru et al. | |
| 2017/0053051 A1* | 2/2017 | De | G06F 30/30 |

(Continued)

OTHER PUBLICATIONS

Application and File History for U.S. Appl. No. 13/683,912, filed Nov. 21, 2012, Inventors Talupuru, et al.

(Continued)

*Primary Examiner* — Terrell S Johnson
(74) *Attorney, Agent, or Firm* — Patterson Thuente Pedersen, P.A.

(57) ABSTRACT

A computer implemented method includes identifying in an original circuit output signals that drive domain crossing logic separating a first clock domain from a second clock domain. A revised circuit is formed with a register attached to the domain crossing logic. The register receives an output signal and a synchronization signal that precludes the output signal from transitioning at selected clock cycle intervals.

19 Claims, 5 Drawing Sheets

(56) References Cited

U.S. PATENT DOCUMENTS

2018/0088623 A1    3/2018  Talupuru et al.

OTHER PUBLICATIONS

Application and File History for U.S. Appl. No. 15/783,559, filed Oct. 13, 2017, Inventors Talupuru, et al.
Google search for an original circuit output signals that drive domain crossing logic separating a first clock domain driven by a first clock from a second clock domain driven by a second clock, wherein the first clock and the second clock have different frequencies; and form a revised circuit with a register in the first clock domain attached to the domain crossing logic, wherein the register receives a synchronization signal and a first domain crossing signal for the output signals, Jul. 13, 2017, 2 pages.

* cited by examiner

APPARATUS AND METHOD FOR ACHIEVING GLITCH-FREE CLOCK DOMAIN CROSSING SIGNALS

CROSS-REFERENCE TO RELATED APPLICATIONS

This application is a continuation of application Ser. No. 15/783,559 filed Oct. 13, 2017, which is a continuation of application Ser. No. 13/683,912 filed Nov. 21, 2012, now U.S. Pat. No. 9,817,433 issued Nov. 14, 2017, which claims priority to U.S. Provisional Patent Application No. 61/562,975, filed Nov. 22, 2011, entitled, "Achieving Glitch-Free Clock Domain Crossing Signals Using Formal Verification, Static timing Analysis and Sequential Equivalence Checking", each of which are incorporated herein by reference.

FIELD OF THE INVENTION

This invention relates generally to digital circuit design. More particularly, this invention relates to techniques for achieving glitch-free clock domain crossing signals.

BACKGROUND OF THE INVENTION

Current System-on-a-chip (SoC) designs contain increased levels of functional and structural complexities within a single system. With this integration of multiple design functionalities, various clock domains are introduced for different portions of the SoC. Verification of these Clock Domain Crossing (CDC) designs presents daunting challenges since there are issues related to transistor level analog effects. Traditional Register Transfer Level (RTL) functional simulation verification techniques are insufficient to identify these analog issues.

Known CDC related issues include metastability issues caused by setup and hold-time violations of flip-flops, jitter due to unpredictable delays across clock domains, functional issues due to convergence and divergences of crossover paths and functional issues due to divergence of metastable signals. Although static timing analysis (STA) is useful, it requires manual inspection, it assumes false paths, and it is prone to errors. Gate-level simulations, which are performed as a part of regular verification, may or may not find timing violations, depending upon timing constraints and the implementation. If a gate-level simulation finds a timing violation for any path of a CDC signal, one cannot be sure whether there are any other potential violations in various CDC paths. Fixing the design at these late stages is also very risky.

Various CDC verification approaches are known. These include using CDC electronic design automation (EDA) tools, which utilize formal verification techniques to find System Verilog Assertions have been used to find CDC issues in simulation.

Most prior art approaches assume that there is no combinatorial logic in a domain crossing and in most cases combinatorial logic in a clock domain crossing is not recommended. However, if combinatorial logic in domain crossings is required to meet performance goals or for any other reason, it is important to insure that the glitches from the output of the combinatorial logic do not cause potential timing violations at the receiver.

SUMMARY OF THE INVENTION

A computer implemented method includes identifying in an original circuit output signals that drive domain crossing logic separating a first clock domain from a second clock domain. A revised circuit is formed with a register attached to the domain crossing logic. The register receives an output signal and a synchronization signal that precludes the output signal from transitioning at selected clock cycle intervals.

A non-transitory computer readable storage medium includes executable instructions to identify in an original circuit output signals that drive domain crossing logic separating a first clock domain from a second clock domain. A revised circuit is formed with a register attached to the domain crossing logic. The register receives an output signal and a synchronization signal that precludes the output signal from transitioning at selected clock cycle intervals.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Consider two synchronous clock domains that can run at various integer and non-integer dock ratios, such as 1:1, 2:1, 3:2, etc. It is important to avoid fractional cycle-times across clock domains. In other words, a timing constraint between flip-flops across clock domains should be at least one cycle-time of the fastest clock.

Figure 1:
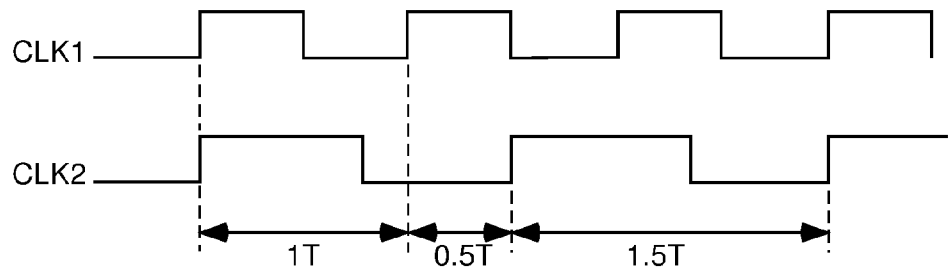
FIG. 1 illustrates 3:2 clock ratio waveforms.

FIG. 1 illustrates 3:2 clock ratio waveforms Signal CLK1 has three cycles for every two cycles of CLK2. The figure illustrates the possible time periods between positive edge to positive edge of faster clock (CLK1) to slower clock (CLK2) at 1T, 0.5T and 1.5T, where T is the cycle time of the faster clock. A design goal is to have a set-up time of at least 1T cycle time.

Figure 2:
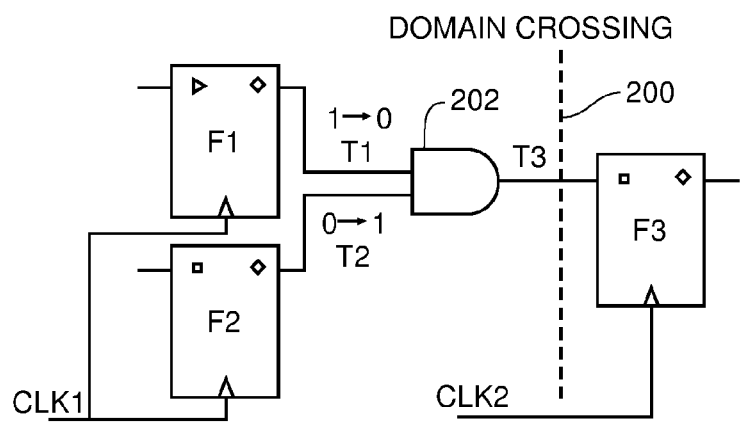
FIG. 2 illustrates an exemplary CDC design

FIG. 2 illustrates flip-flops F1 and F2 responsive to CLK1. Therefore, the flip-flops are in a faster clock domain. Flip-flop F3 is responsive to CLK2 and therefore is in a slower clock domain. A clock domain crossing is shown with line 200.

Figure 3:
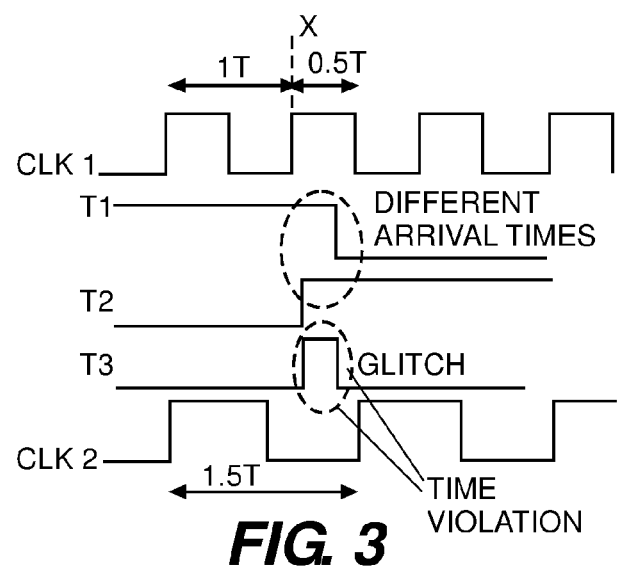
FIG. 3 illustrates a glitch in a CDC design.

Signals T1 and T2 are launched by clock domain CLK1 and go through combinatorial logic 202 before being captured in clock domain CLK2. Since the design goal is at least 1T cycle time, flip-flops F1 and F2 in the first domain cannot launch at the 0.5T edge, which is shown as X in FIG. 3. When data is transferred from the first clock domain to the second clock domain at edge X, there is a possibility of a glitch, even though this cannot be seen in a functional simulation. In particular, if at clock edge X inputs T1 and T2 of AND gate 202 respectively change from one to zero and zero to one, at the positive edge of clock CLK1 a 0 value at the output of the AND gate 202 should be maintained. However, if T1 and T2 have different arrival times because of real circuit delays, then there may be a glitch at the output of the AND gate before the AND gate output T3 settles to zero. If the CLK2 clock edge, which is 0.5T later, were to sample the output of the AND gate, then there is a possibility that this edge would capture the glitch generated at the AND gate output, which can cause a possible functional failure of the design.

Figure 4:
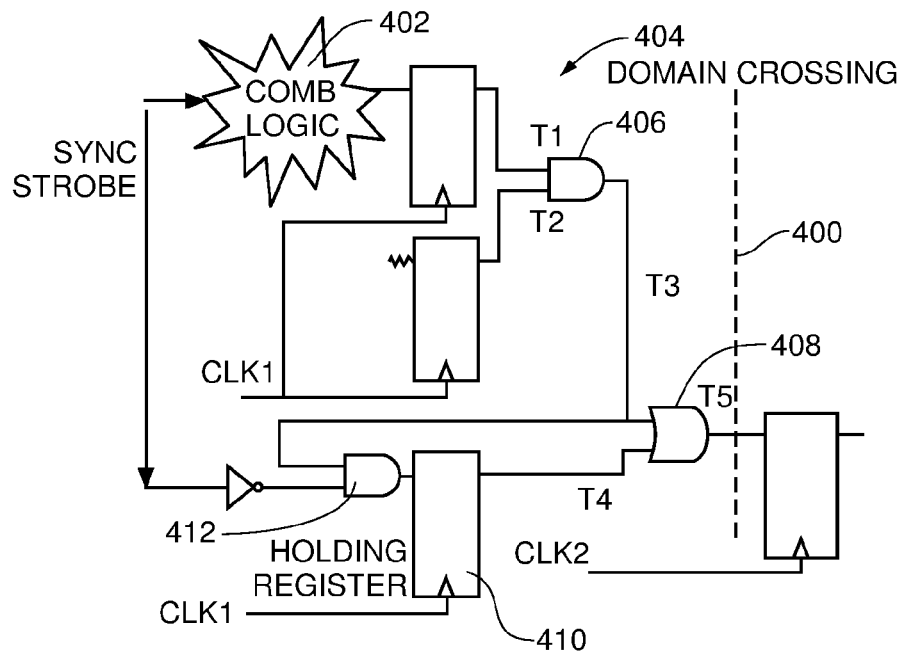
FIG. 4 illustrates an exemplary CDC design utilized in accordance with an embodiment of the invention.

FIG. 4 illustrates a sample CDC design with a first clock domain CLK1 separated from a second clock domain CLK2 by domain crossing line 400. The first clock domain has a combinatorial logic block 402 and domain crossing logic 404.

Figure 5:
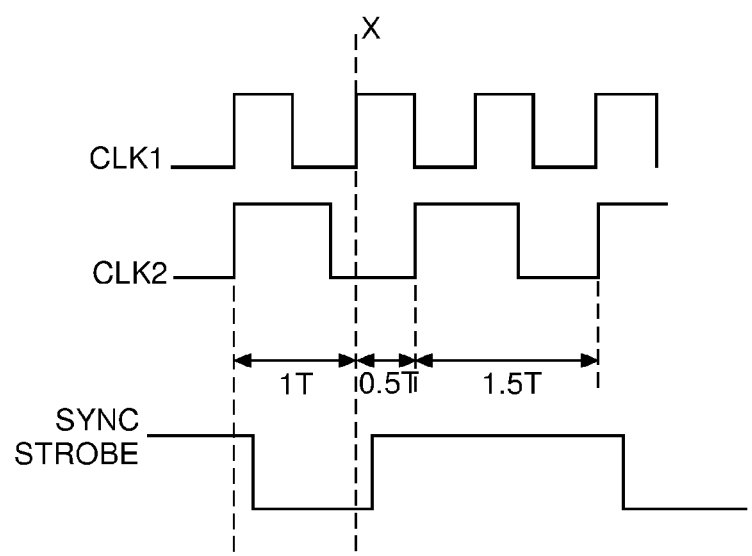
FIG. 5 illustrates 3:2 clock ratio waveforms along with a synchronization strobe utilized in accordance with an embodiment of the invention.

FIG. 5 illustrates waveforms processed by the circuit of FIG. 4. As in the prior example, there is a 3:2 clock ratio with signal CLK1 being the faster clock. A static timing analysis tuned for a 1T timing constraint can detect a glitch at 1T and 1.5T cycle paths. For 0.5T cycle paths, a static timing analysis check will result in many false violations. Therefore, for 0.5T paths a formal verification is used to prove that a glitch cannot transpire. The sync strobe of FIG. 5 is de-asserted for 0.5T paths. Therefore, the CLK1 domain flops cannot launch. Thus, if the sync strobe is low, a data stability assertion at signal T5 is equal to its value one cycle before.

Domain crossing logic 404 includes a logical AND gate 406 to receive signals T1 and T2, with an output T3 driving logical AND gate 408. In accordance with an embodiment of the invention, a register 410 is added to the domain crossing logic 404. The register is triggered by clock signal CLK1 The input to the register is from logical AND gate 412, which receives signal T3 and the sync strobe. The output of the register is signal T4, which drives gate 408 to produce domain crossing signal T5.

A system Verilog assertion is shown below to check the stability of signal T5 at clock edge X, where 0.5T is the timing between CLK1 and CLK2 clock edges.

Check_Signal_Stability_at_0.5_T_edge:assert property(@(posedgeClk1)disableiff(reset) !sync_strobe|=>(T5==$past(T5)));

If formal verification proves the above property exhaustively, then it is guaranteed that the CLK1 domain flops do not launch at 0.5T cycles. Consequently, there will not be any glitches. This property needs to be instantiated for all the signals that cross the domain. This property also needs to be proven using formal verification to achieve a glitch free CDC. Writing the assertions at the very end of the combinatorial logic can lead to a false positive formal proof.

Figure 6:
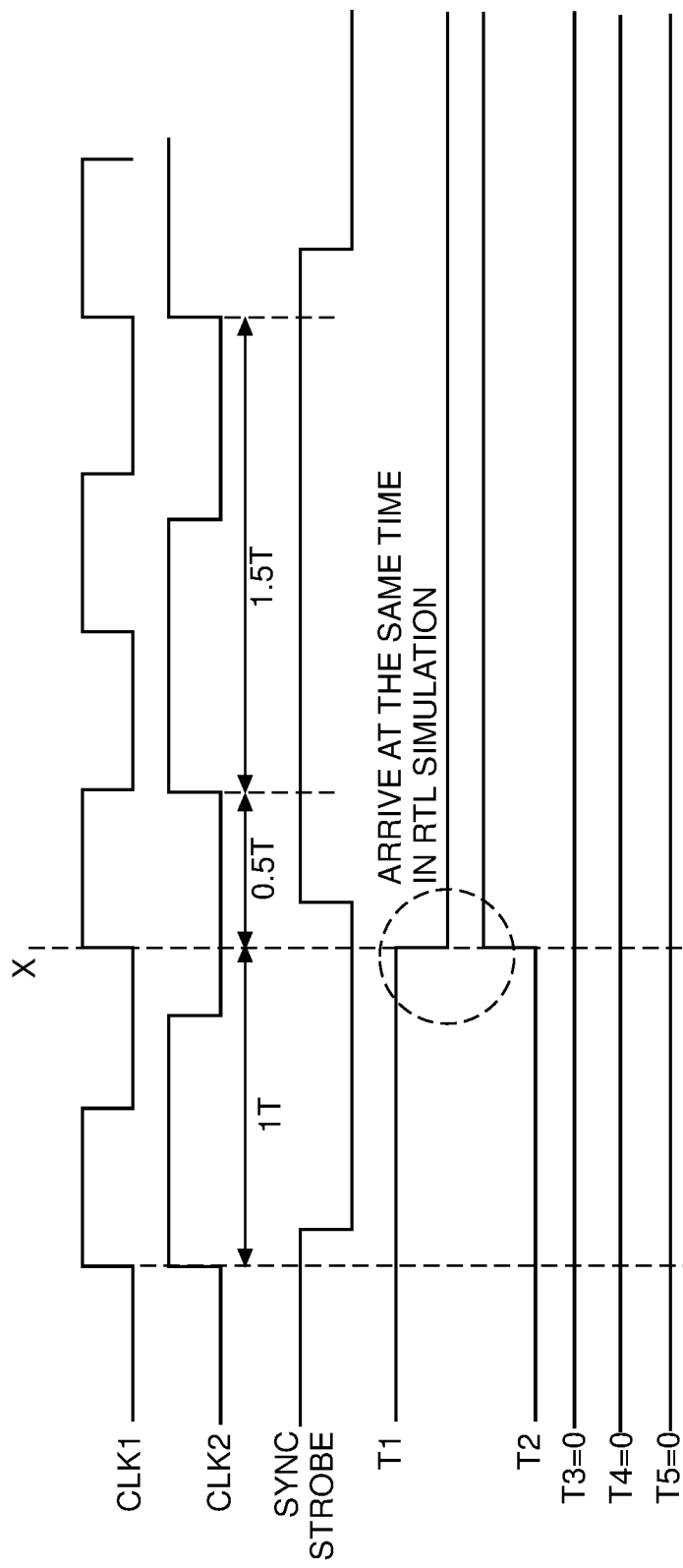
FIG. 6 illustrates a false positive waveform that can occur in the prior art.

In FIG. 4, an assertion is written to check the glitch at the end of the combinatorial logic, namely signal T5. The potential glitch is then masked out at the RTL level. For example, in FIG. 4, at 0.5T cycles if inputs T1 and T2 of AND gate 406 change from one to zero and zero to one, respectively, at the positive edge of CLKI, then this should effectively maintain a value of zero at the output of the AND gate 406 (signal T3). This behavior is shown in FIG. 6, where T1 and T2 arrive at the same time. Consequently, there is no value change in T3 and T5. Therefore, if the assertion is written for signal T5, then even though the CLK1 flops lunched at 0.5T cycles, the signal T5 value looks stable and the assertion is proven correct. As a result, one gets false positives in formal proofs at the RTL flop outputs that drive the domain crossing combinatorial logic. For example, in FIG. 4, signals T1, T2 and T4 are the outputs of the first domain that drive gate 408. Properties are written at those flip-flops to make sure that there is no signal value change at selected clock cycle intervals (0.5T cycles in this example) for all launch outputs. If formal verification falsifies the assertion, then there is real potential for the glitch to occur in the hardware. The same checks can be extended to 1.5T and 1T cycles. Sample code for getting all launching flip-flop outputs using static timing analysis is shown below.

```
proc rpt_flop_op_info { }{
    foreach_in_collection tim_path[get_timing_paths group CLK2 max_paths 100000]{
    #Startpoitns
    set sp_clk_pin CLKl
    set flop_out_pin [get_pins filter "pin_direction ==out"- of_objects [get_cells - of_objects CLKl]
    Echo "Flop outputs: [get_object_name $flop_out_pin]"}}
```

Once one secures the list of launch flip-flop outputs, the list can be converted to a script to generate assertions of the type shown below.

property Check_Signal_Stability_at_0.5T_edge (T);
@(posedge Clk1) disable iff(reset) !sync_strobe|=>(T==$past(T));
endproperty
Sig_T1: assert property (Check_Signal_Stability_at_0.5T_edge(T1));
Sig_T2: assert property (Check_Signal_Stability_at_0.5T_edge(T2));
Sig_T4: assert property (Check_signal_Stability_at_0.5T_edge(T4));

When a glitch is identified and cured utilizing the foregoing techniques, the modified RTL should be functionally equivalent to the original RTL. To prove equivalency between two RTL designs, one cannot make use of EDA tools like Conformal/Formality since they require one-to-one matching of flip-flops, which may not be available after the bug fix. To overcome this limitation, sequential equivalency checking is implemented.

Figure 7:
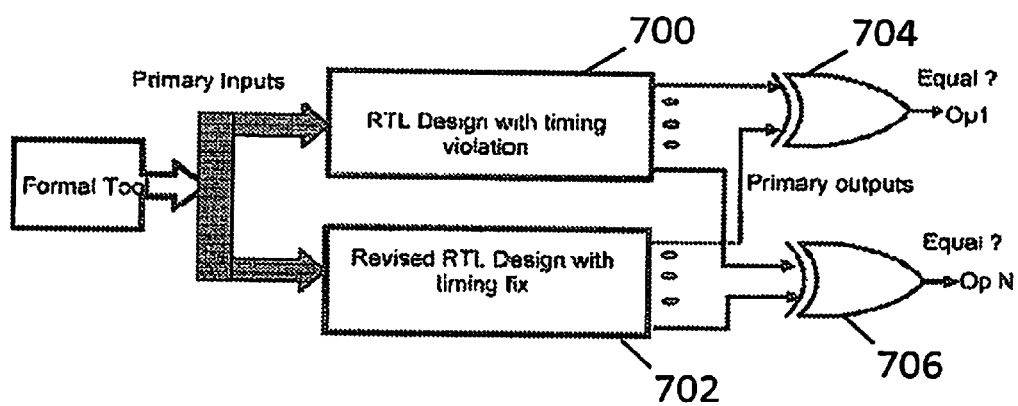
FIG. 7 illustrates a sequential equivalence checking mechanism that may be used in accordance with an embodiment of the invention.

FIG. 7 illustrates one approach. Input signals are simultaneously applied to an original RTL design with a timing violation 700 and a revised RTL design with a timing fix 702. The outputs are applied to Exclusive-OR gates 704 and 706. The Exclusive-OR gates generate a digital high value when inputs are not equal; when inputs are equal, a digital low is generated. Thus, these circuits may be used for equivalency checks.

The outputs of RTL 700 and RTL 702 may be supplemented to confirm that the output of the gates 704 and 706 is never one. For example, the following code may be used:
assert property (@(posedge elk)Op1!=1);
assert property (@(posedge elk)OpN!=1);
If the output is never one, then the two designs are functionally equivalent.

Figure 8:
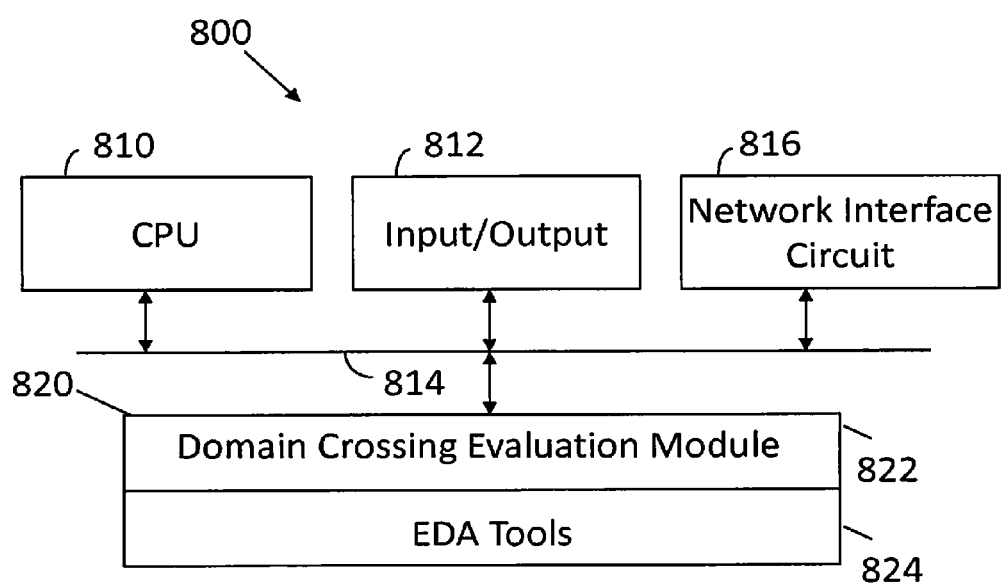
FIG. 8 illustrates a computer used to implement an embodiment of the invention.

FIG. 8 illustrates a computer 800 that may be used to implement operations of the invention. The computer 800 includes standard components, such as a central processing unit 810 connected to input/output devices 812 via a bus 814. The input/output devices 812 may include a keyboard, mouse, display and the like. A network interface circuit 816 is also connected to the bus 814 to allow the computer 800 to operate in a networked environment. A memory 820 is also connected to the bus 814. The memory 820 stores executable instructions to implement operations of the invention. For example, the memory 820 may store a domain crossing evaluation module 822, which includes executable instructions to implement disclosed operations. The domain crossing evaluation module 822 may operate in a standalone manner and/or it may operate in conjunction with standard electronic design automation (EDA) tools 824. In one embodiment, the domain crossing evaluation module 822 identifies in an original circuit output signals that drive domain crossing logic separating a first clock domain from a second clock domain. The domain crossing evaluation module 822 may be used to form a revised circuit with a register attached to the domain crossing logic. The register receives an output signal and a synchronization signal that precludes the output signal from transitioning at selected clock cycle intervals, thereby insuring glitch-free clock domain signal crossings. The domain crossing evaluation module 822 may also include executable instructions to perform the disclosed testing operations. That is, the domain crossing evaluation module 822 may be used to simultaneously apply test signals to the original circuit and the revised circuit and to evaluate output signals from the original circuit and the revised circuit for equivalency.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known non-transitory computer usable medium such as semiconductor, magnetic disk, or optical disc (e.g., CD-ROM, DVD-ROM, etc.). It is understood that a CPU, processor core, microcontroller, or other suitable electronic hardware element may be employed to enable functionality specified in software.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A non-transitory computer readable storage medium, comprising executable instructions to:
   form a circuit comprising drive domain crossing logic separating a first clock domain driven by a first clock from a second clock domain driven by a second clock wherein the first clock and second clock have different frequencies, the circuit further comprising a register attached to the domain crossing logic, wherein the register receives an output signal and a synchronization signal that precludes the output signal from transitioning at selected clock cycle intervals.

2. The non-transitory computer readable storage medium of claim 1, wherein the circuit is a revised circuit based on an original circuit.

3. The non-transitory computer readable storage medium of claim 2, the non-transitory computer readable storage medium further comprising executable instructions to simultaneously apply test signals to the original circuit and to the revised circuit and to apply the resulting outputs from the original circuit and revised circuit to logic gates to generate a digital value.

4. The non-transitory computer readable storage medium of claim 3, wherein the logic gates comprise Exclusive-OR gates.

5. The non-transitory computer readable storage medium of claim 4, wherein the digital value is a digital high value when the test signals are not equal.

6. The non-transitory computer readable storage medium of claim 4, wherein the digital value is a digital low value when the test signals are equal.

7. The non-transitory computer readable storage medium of claim 1, wherein the circuit is expressed in Register Transfer Level (RTL) code.

8. The non-transitory computer readable storage medium of claim 1, wherein the selected clock cycle interval comprises a 0.5T clock cycle interval.

9. A computer implemented method, comprising:
   forming a circuit comprising drive domain crossing logic separating a first clock domain driven by a first clock from a second clock domain driven by a second clock wherein the first clock and second clock have different frequencies, the circuit further comprising a register attached to the domain crossing logic, wherein the register receives an output signal and a synchronization signal that precludes the output signal from transitioning at selected clock cycle intervals.

10. The method of claim 9, wherein the circuit is a revised circuit based on an original circuit.

11. The method of claim 10, further comprising:
    simultaneously applying test signals to the original circuit and to the revised circuit; and
    applying the resulting outputs from the original circuit and revised circuit to logic gates to generate a digital value.

12. The method of claim 11, wherein the logic gates comprise Exclusive-OR gates.

13. The method of claim 12, wherein the digital value is a digital high value when the resulting outputs are not equal or wherein the digital value is a digital low value when the resulting outputs are equal.

14. The method of claim 9, further comprising expressing the circuit in Register Transfer Level code.

15. The method of claim 9, wherein the selected clock cycle interval comprises a 0.5T clock cycle interval.

16. The method of claim 9, further comprising embodying the circuit in a hardware description language.

17. The method of claim 9, further comprising transforming the circuit to hardware.

18. A circuit comprising:
    drive domain crossing logic separating a first clock domain driven by a first clock from a second clock domain driven by a second clock wherein the first clock and second clock have different frequencies, the circuit further comprising a register attached to the domain crossing logic, wherein the register receives an output signal and a synchronization signal that precludes the output signal from transitioning at selected clock cycle intervals.

19. The circuit of claim 18, wherein the circuit is an integrated circuit.

\* \* \* \* \*